United States Patent [19]
Peck

[11] Patent Number: 5,833,251
[45] Date of Patent: Nov. 10, 1998

[54] CONVERTIBLE WAGON

[76] Inventor: Dennis J. Peck, 4617 S. 13th St., Milwaukee, Wis. 53221-2403

[21] Appl. No.: 671,449

[22] Filed: Jun. 27, 1996

[51] Int. Cl.[6] ....................................................... B62M 1/00
[52] U.S. Cl. .......................................................... 280/87.01
[58] Field of Search ........................... 280/87.01, 87.043, 280/47.38, 47.371, 655.1, 47.35; 296/104, 102, 43, 97.21; 446/428, 96, 78, 427, 75; D21/76, 78, 79

[56] References Cited

U.S. PATENT DOCUMENTS

| | | | |
|---|---|---|---|
| 1,712,331 | 5/1929 | Christensen | 446/451 |
| 4,963,115 | 10/1990 | Stowell Davin | 446/96 |
| 5,360,222 | 11/1994 | Bro | 280/87.021 |
| 5,447,354 | 9/1995 | Delp | 296/104 |
| 5,474,483 | 12/1995 | Sun | 446/71 |

OTHER PUBLICATIONS

Flyer #457 of Northern Hydraulics Catalog, Inc. Of Burnsville, Minnesota. Flyer expired Apr. 22, 1996.

*Primary Examiner*—Robert J. Oberleitner
*Assistant Examiner*—C. J. Bartz
*Attorney, Agent, or Firm*—Wheeler Kromholz & Manion

[57] ABSTRACT

A convertible wagon adaptable for a multitude of functions, and containing several compartments with hinged doors for storing equipment being transported to a site, and at the same time being capable of carrying a passenger or article resting on its topside. The compartments may be insulated for carrying hot or cold food items. The wagon may also be arranged for transporting a child-bearing car seat.

2 Claims, 6 Drawing Sheets

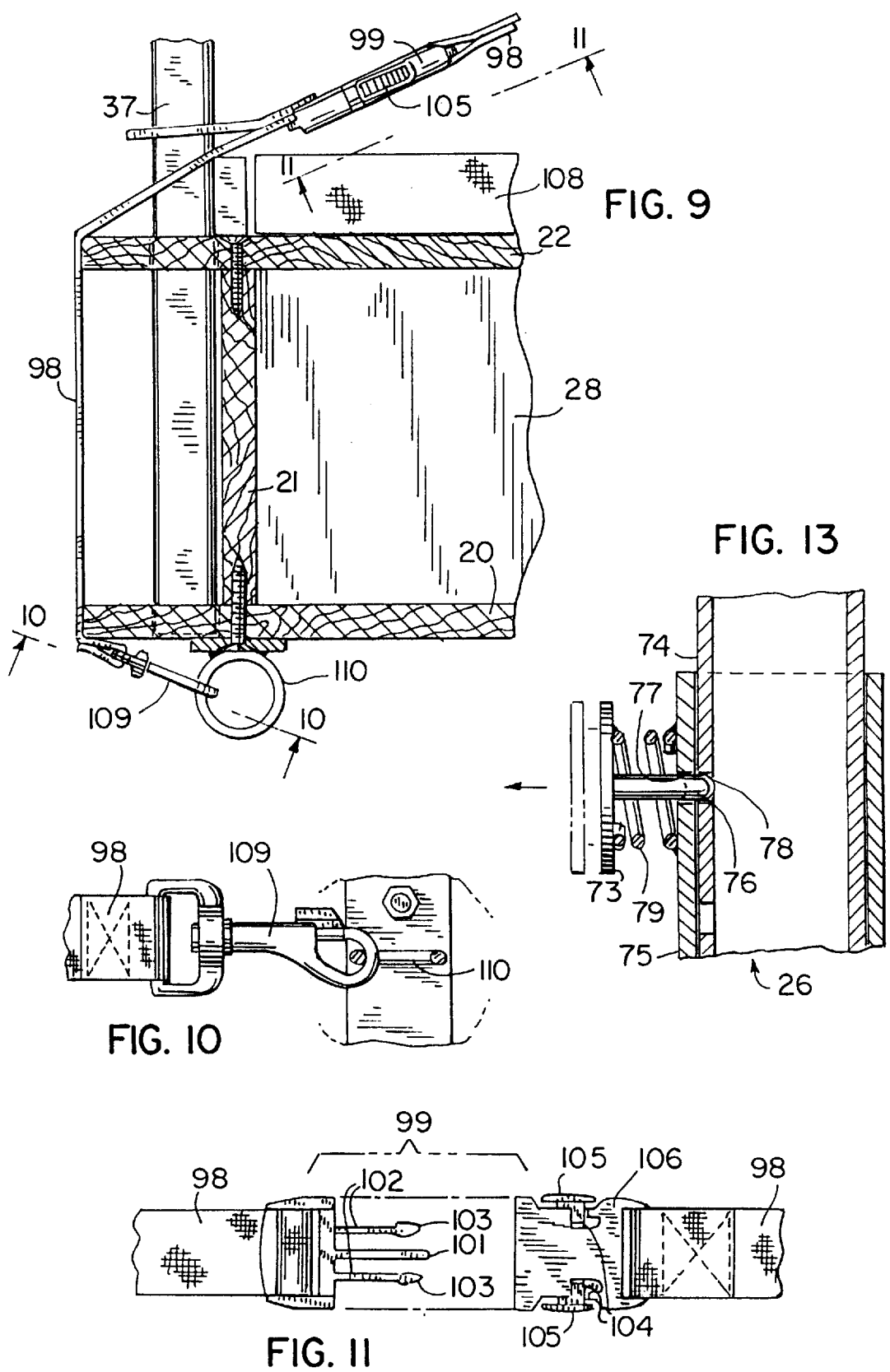

CONVERTIBLE WAGON

BACKGROUND OF THE INVENTION

Over the many years since the introduction of children's toy or coaster wagons, these vehicles have been modified to accommodate many utilitarian uses. For instance, as disclosed in Flyer #457 of Northern Hydraulics Catalog, Inc. of Burnsville, Minn., which flyer expired Apr. 22, 1996, several wagon modifications were offered for sale. These included sided garden haulers, steel and wooden flatbed wagons, wagons with staked sides panels and conventional steel "Red Wagon" types. None of these, or other known vehicles appear to provide versatile compartmented vehicles suitable for conversion to a multitude of utilitarian functions.

SUMMARY OF THE INVENTION

The present invention provides a wagon or similar vehicle which may be readily converted to a variety of structural modifications for a multitude of recreational. and other functional activities. In its simplest form the improved wagon utilizing a conventional flatbed, and having an enclosed four-sided primary compartment supported thereabove. The cover for the compartment is also of flatbed construction and of substantially identical dimension and overlying the first-mentioned flatbed. The compartment is also provided with a hinged access door. The compartment is adaptable for a variety of functions, such as carrying a foldable picnic table and umbrella, or, for instance, providing storage for removable staked side panels when not in use.

In addition, the compartment may contain a secondary compartment adapted to cover a harness for holding a small child or for anchoring a conventional baby or child support or carseat.

The improved wagon may further include a container or under compartment supported by and suspended from the underside of the flatbed, which may also act as an enclosing cover for the container. The walls and bottom of the container are preferably lined with heat insulating material for maintaining items contained therein at desired warm or cold temperature.

A steering handle is provided which may be readily removed should it be desired to hitch the wagon to another articulated wagon. The steering handle may preferably be of two part construction with one part being of a dimension capable of telescoping interiorly of the other part or member to shorten or lengthen the handle as desired. A thumb operated, spring biased latching pin is also provided for retaining the members in elongated telescoped position.

The improved wagon may also be converted to a covered "Conestoga" type wagon by providing support means at the top of stiles supporting the aforementioned side panels, and for receiving and supporting longitudinally spaced, U-shaped strap members. A flexible plastic or cloth member is provided and preferable hemmed to receive the straps and support the structure for weather protection or for children "covered wagon" or "Conestoga" simulation.

DESCRIPTION OF THE DRAWINGS

FIG. 9 is a fragmentary sectional view taken along lines 9—9 of FIG. 7, and illustrating, in detail, means for anchoring a supporting harness strap;

FIG. 10 is a fragmentary detail view taken along lines 10—10 of FIG. 9;

FIG. 11 is a fragmentary detail view taken along lines 11—11 of FIG. 9, and illustrating buckling means for securing a child support or carseat or other child support means;

FIG. 13 is a fragmentary cross sectional view taken along curved lines 13—13 of FIG. 12.

DETAILED DESCRIPTION

The above described embodiments of this invention are merely descriptive of its principles and are not to be limited. The scope of this invention instead shall be determined from the scope of the following claims, including their equivalents.

Figure 1:
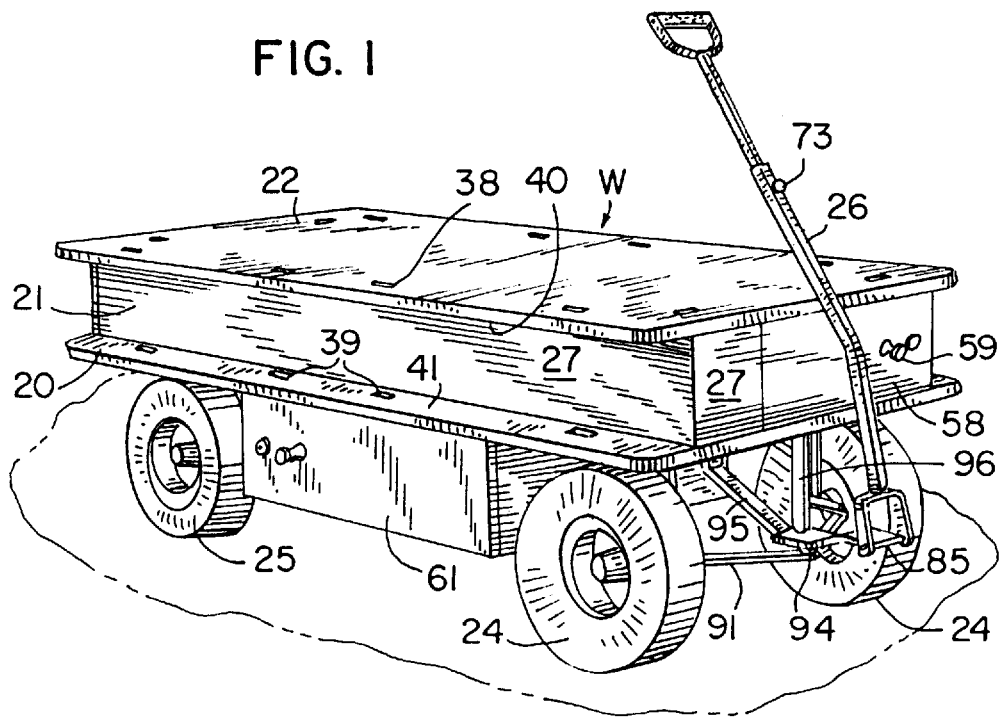
FIG. 1 is a perspective view of the convertible wagon of this invention in its basic compartmentalized structural configuration.
Figure 2:
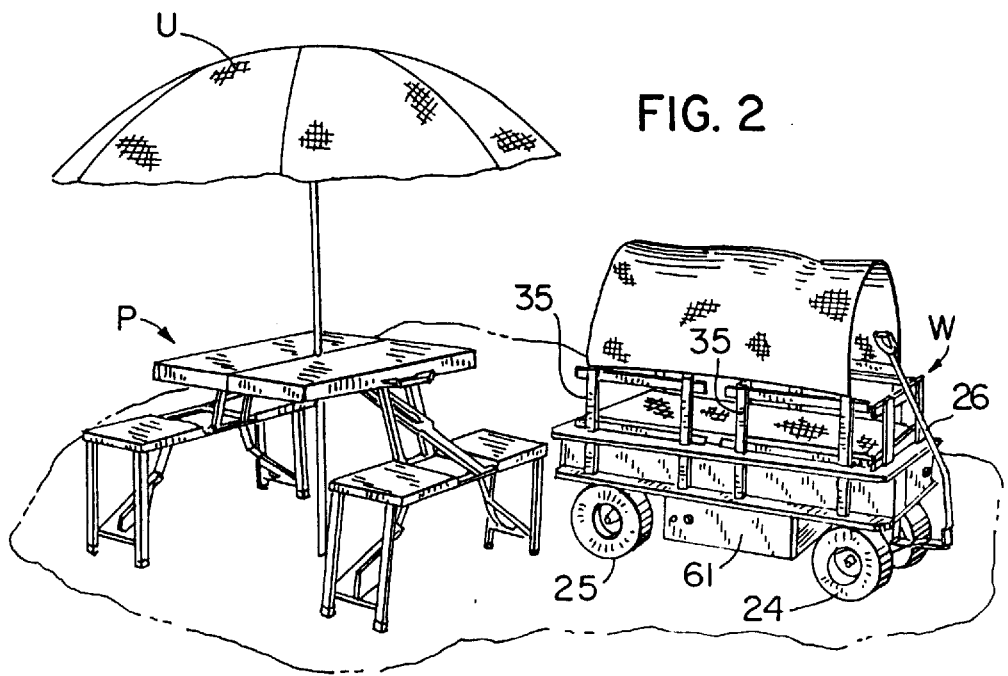
FIG. 2 is sketch depicting a "picnic scene" with a foldable picnic table supporting a foldable umbrella, and with the improved convertible wagon positioned nearby and outfitted with a "Conestoga" type cover and staked side panels, in addition to having a secondary insulated storage compartment supported beneath the flatbed of the wagon.
Figure 3:
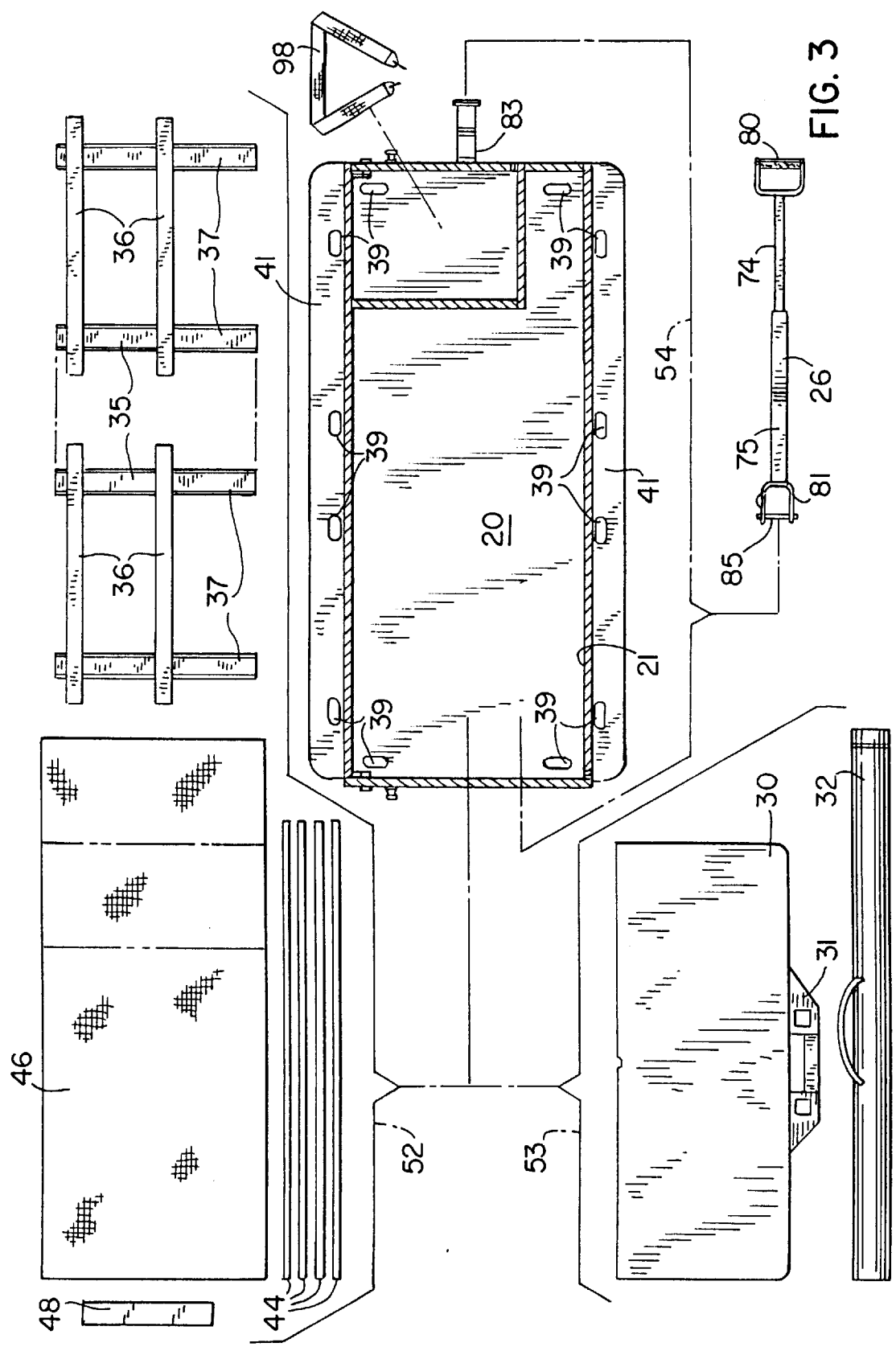
FIG. 3 is a top plan view, partly in section, of the wagon of FIG. 1, and illustrating the main compartment supported by the wagon flatbed and having a smaller or secondary compartment therein, both of said compartments having hinged doors accessing the interior of the compartments, the secondary compartment being adapted for receiving and storing a harness and other gear, such, for instance, holddown gear for securing a child support or child support or carseat. Phantom lined areas depict the collapsible steering handle, removable staked side panels, and alternatively storable covering straps and cover, and foldable table and umbrella carrying cases, each of which may be stored in the various compartments of the wagon.

With reference to the views of FIGS. 1–3, inclusive, it will be noted that the improved convertible wagon, indicated by the general reference character W, may be utilized for various functions. (The wagon W will hereinafter be described in detail.) With particular reference to FIG. 1, the basic components of the wagon W comprise a flatbed 20 supporting a primary compartment 21 enclosed by means of a flat cover 22, a lower compartment 23 supported by and suspended below the flatbed 20, a front set of steerable wheels 24 a rear set of wheels 25 and a steering handle 26. The primary compartment is enclosed by means of a cover 22, side walls 27 and a rear door 28.

Figure 5:
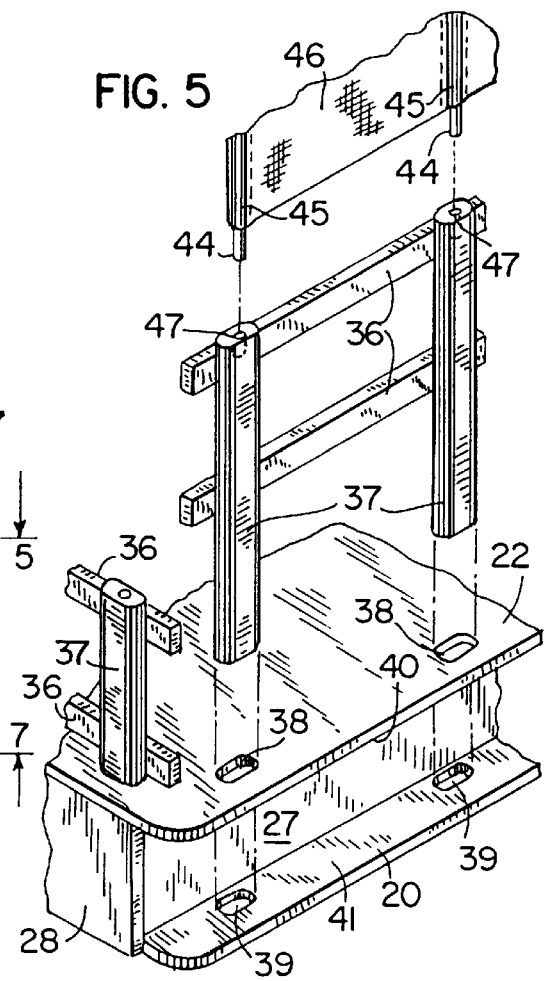
FIG. 5 is a fragmentary perspective view of the wagon, and illustrating the means of supporting the staked side panels.

As will be apparent from the view of FIG. 2, the wagon W may be used in a family picnic setting. Here, a conventional, foldable picnic table and bench combination P is provided with a conventional shade umbrella, and may be folded into a carrier configuration 30 having a carrying handle 31. (See FIG. 3) The umbrella U is foldable and may be compacted to fit into a carrying case 32 (See FIG. 3). As shown in FIGS. 2 and 3, the wagon W may be modified to take the form of a covered wagon, or miniature Conestoga version. Basically, for either a covered wagon version or a version with staked side panels, a sufficient quantity of panels 35 are provided. These side panels 35 each comprise a pair of vertically spaced rails 36 supported by horizontally spaced stiles 37. The lower end portions of the stiles 37 are arranged to be removable inserted, or staked, into aligned apertures 38 and 39 in the outwardly extending portions 40 and 41 of the flat cover 22 and the flatbed 20, respectively. The covered wagon made up of a plurality of spaced apart, hooplike straps 44 threaded through gussets 45 sewed into a cover 46 made of cloth or light weight plastic 46. (See FIG. 5). The straps 44 are preferably of spring steel and are threaded through the gussets 45 of the cover 46 and thereafter the ends are inserted into reentrant openings 47 drilled into the upper ends of each of supporting stiles 37 to complete the Conestoga type covered wagon.

Referring again to FIG. 3, it will be observed that the cover 46 may be folded (with the straps 44 removed) into a package 48. The umbrella U may also be folded and compacted to fit into a carrying case 32. FIG. 3 also illustrates the handle 26 in its removed configuration. Thus, the phantom lines 52, 53 and 54 respectively define areas relating to the covered wagon components (52), picnic table and umbrella (53) and steering handle (54), each of which may be conveniently packed, either individually or together, within the confines of the primary compartment 21

Figure 4:
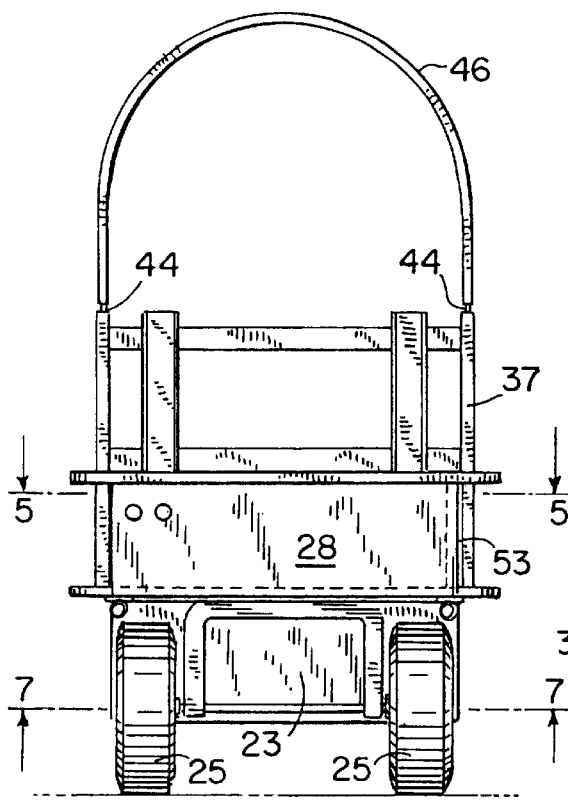
FIG. 4 is a rear view of the wagon of FIG. 1.
Figure 6:
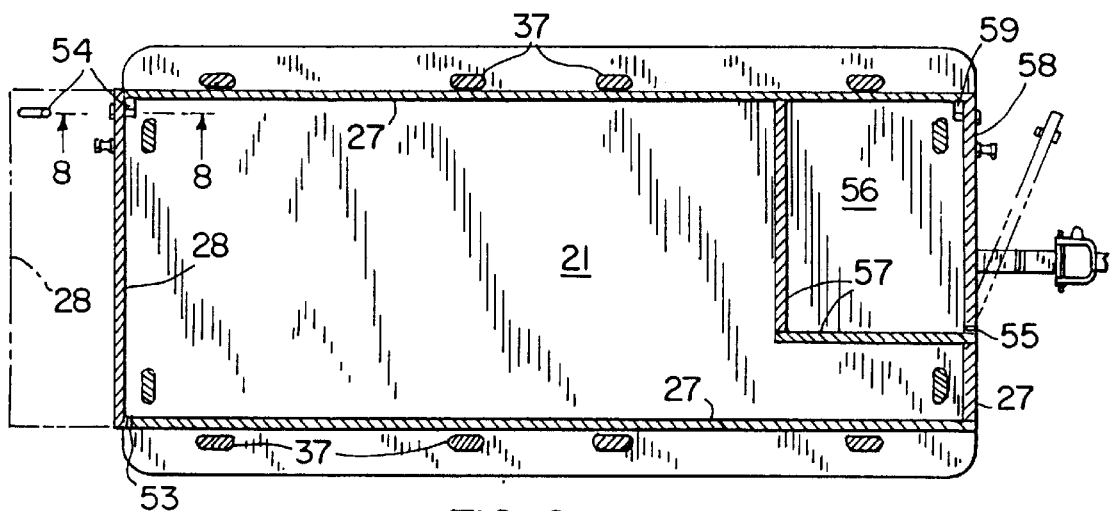
FIG. 6 is a top sectional view taken along lines 6—6 of FIG. 4.

With reference to the views of FIGS. 1, 4, and 6, it will be observed that the convertible wagon W may also be provided with additional compartments, each accessible from the exterior. As shown in FIGS. 4 and 6, the primary compartment 21 is provides with a rear access door 52. The door is hinged at 53, and is provided, at the opposite side, with a latch mechanism indicated generally by the reference numeral 54. Details of the latch mechanism 54 will be later described.

A secondary compartment 56 is shown in the view of FIG. 6, and is preferably located within the confines of the primary compartment 21, and makes use of the flat cover 22, common to both the primary and secondary compartments 21, 56, and the side walls 27. The secondary compartment 56 includes interior walls 57 supported between the cover 22 and the flatbed 20, as well as an access door 58. A latch mechanism 59 may be provided in similar fashion as the latch mechanism 54 used with the rear door 28. It is preferable to locate and size the secondary compartment 56 to accommodate and store items, such as the previously described picnic and covered wagon gear. The door 58 is provided with a hinge 55.

Figure 7:
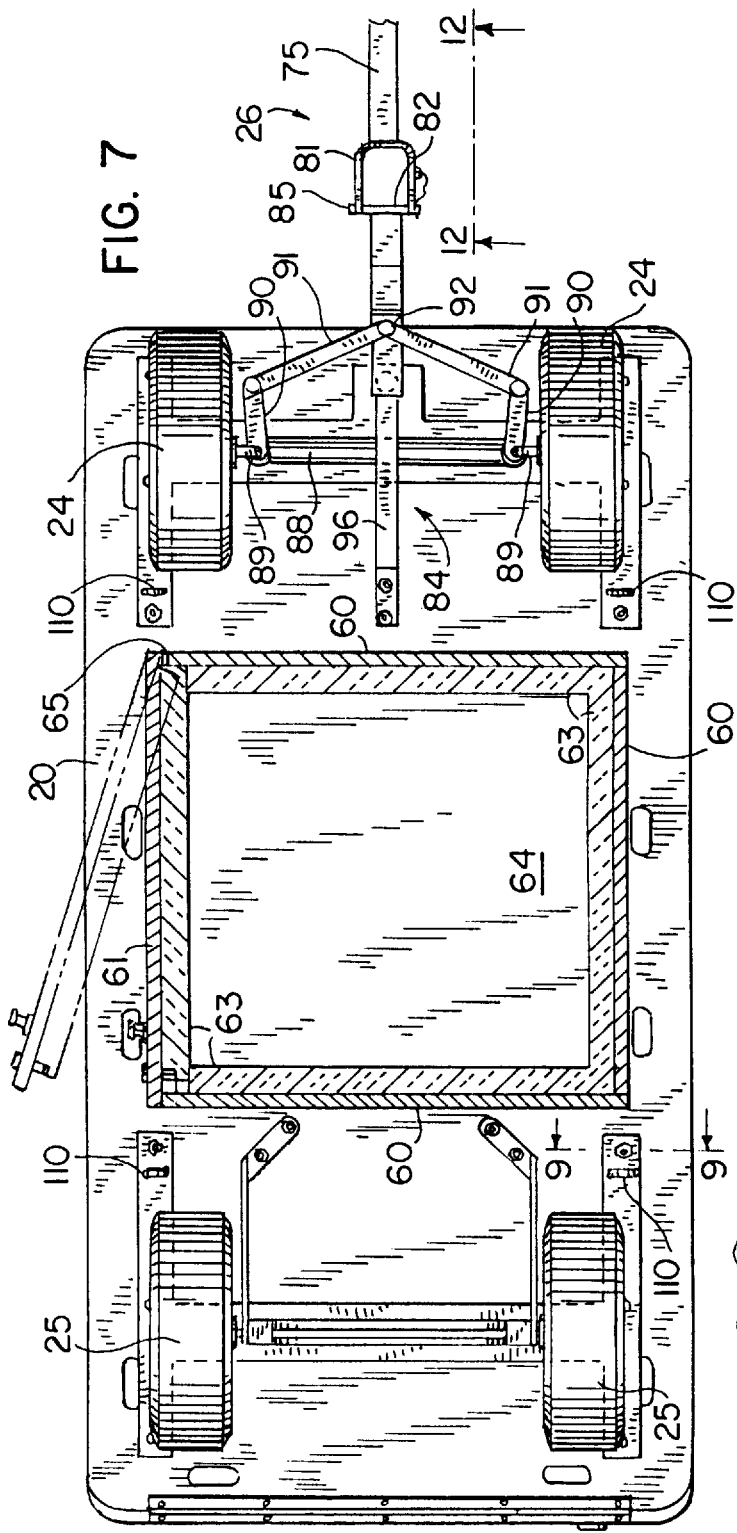
FIG. 7 is a bottom sectional view taken along lines 7—7 of FIG. 4.
Figure 12:
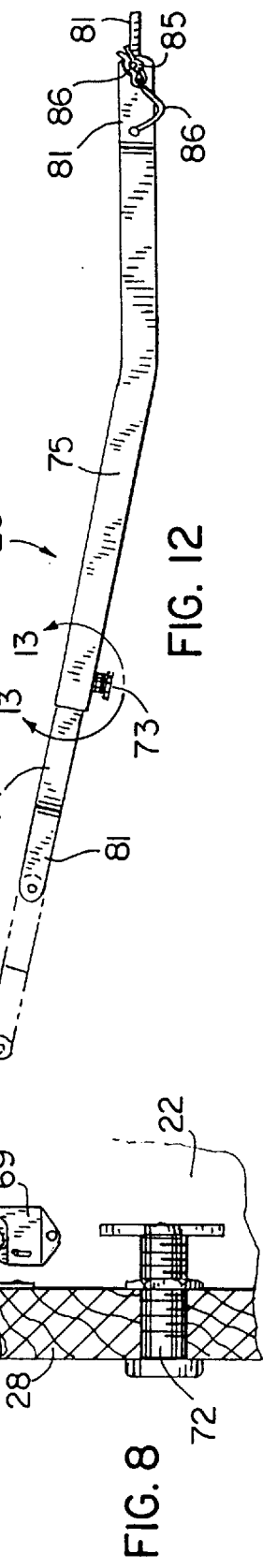
FIG. 12 is a side elevational view taken along lines 12—12 of FIG. 7 and depicting the extensible steering handle in collapsed telescoped position.

As illustrated in the views of FIGS. 1, 4, and 7, a lower compartment 23 may also be provided. It is preferred and convenient to insulate the compartment 23, especially for carrying food to picnics, or the like. The lower compartment 23, as illustrated in the bottom view of FIG. 7, is provides with three side walls 60 supported by and suspended from the underside of the flatbed 20. A bottom member (not shown) is obviously supported by the side walls 60. A hinged door 61 is provided to open outwardly from a side of the wagon W.

A door latch mechanism 62, similar to the latch mechanism 54 of the primary compartment, may also be provided. The inner wall surfaces of the side walls 60, the top surface 64, the door 61 and the bottom, or floor (not shown) may be covered with an insulating material 63, to provide a means for keeping food cool or warm, as desired. The door 61 is provided with a hinge 65.

Figure 8:
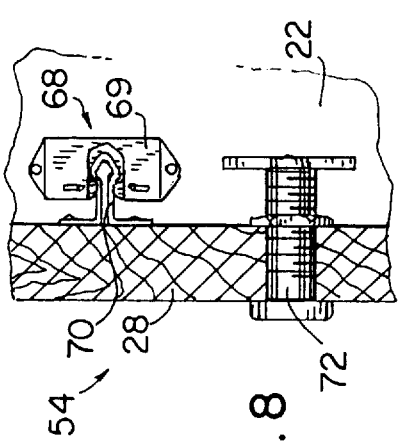
FIG. 8 is a detailed fragmentary section al view taken along lines 8—8 of FIG. 6, and illustrating the means of latching and locking the access doors of the wagon.

The latch mechanisms 54, 59, and 62 are typified by the construction of the mechanism 54 of the primary compartment 21 detailed in the view of FIG. 8. A conventional pinch-type cabinet latch 68 may have its stationary receiver 69 supported by the underside of the cover 22, and be adapted to receive a "hairpin" type clip 70 attached to the door 28 to provide a releasable detent for releasable latching the door 28 to the cover 22, thereby enclosing the compartment 21. A key operated lock mechanism 72 may also be provided for more permanent closure of the door 28. As stated above the latching mechanisms 59 and 62 may be provided in similar member.

As stated previously, the convertible wagon W is preferably provided with a detachable, collapsible handle 26. With reference to FIGS. 3, 7, 12, and 13, the handle 26 comprises telescoping portions 74 and 75. The portion 74 is slidably received by the outer tubular portion 75, and may be latched in place by means of a thumb operated handle latch pin 76 entering an aperture 77 in the outer portion 75, and into detachable engagement with a respective aperture 78 drilled into the portion 74. The pin 76 is biased away from the portions 74 and 75 by means of a compression bias spring 79. The axially spaced apertures 78 permit the handle portions to be telescoped towards one another in detachable retained position at a desired handle length (See FIG. 12). The handle 26 contains a grip member 80 at the distal end of the portion 75, and a yoke 81 secured to the distal end of the handle portion 74. A tubular spacer and retainer 82 is welded or otherwise secured to hitch 83 extending from the steering mechanism 84, to be later described. A removable hitch pin 85 extends through the yoke 81 and tubular retainer 82 on the hitch 83. The pin 85 is apertured its outer end to receive a cotter key 86 secured to the yoke 81 by means of a short chain 86. Thus, the hitch arrangement may be used to retain the handle 26, or, with the handle removed, the hitch may receive a like configured yoke (not shown) extending from the rear of another vehicle or like convertible wagon (not shown); although the presently intended use of the vehicle is as a wagon to be pulled by a person.

The steering mechanism 84 is best described in connection with the view of FIGS. 1 and 7. The mechanism 84 utilizes tie rod steering means which permit the front wheels 24 to be supported independently and stay under the flatbed 20 during cornering. The tie rod steering means includes an anchoring wheel support strap 88 secured to the underside of the flatbed 20 by well-known means such as nut and bolt assemblies or serews, etc. (Not shown). The front wheels 24 are each operated independently from one another and depend from the anchoring strap 88, and are secured to the strap by means of L-shaped, rotatable hangers 89, with an arm acting as a supporting axle for each of the wheels 24. The L-shaped hangers 89 are each rotated by a link member 90 secured to the respective hangers 89 by welding or other securing means. Operation of each of the links 90 is attained by means of the action of intermediate link members 91, each being pivotally supported at its respective distal end by a common pivot pin 92.

It will be observed from the views of FIGS. 1 and 7 that the pivot pin 92 is supported by and depending from a relatively flat plate portion 94 forming a part of the stationary hitch 83. The plate portion 94 is supported by means of a vertical supporting post 95 and a strap member 96 both supported at the underside of the flatbed 20 and depending therefrom.

It will be apparent that the front wheels 24 may be turned independently of one another to provide a means of retaining the wheels 24 under the flatbed 20 when cornering, to thereby provide a very stable wagon construction.

Figure 14:
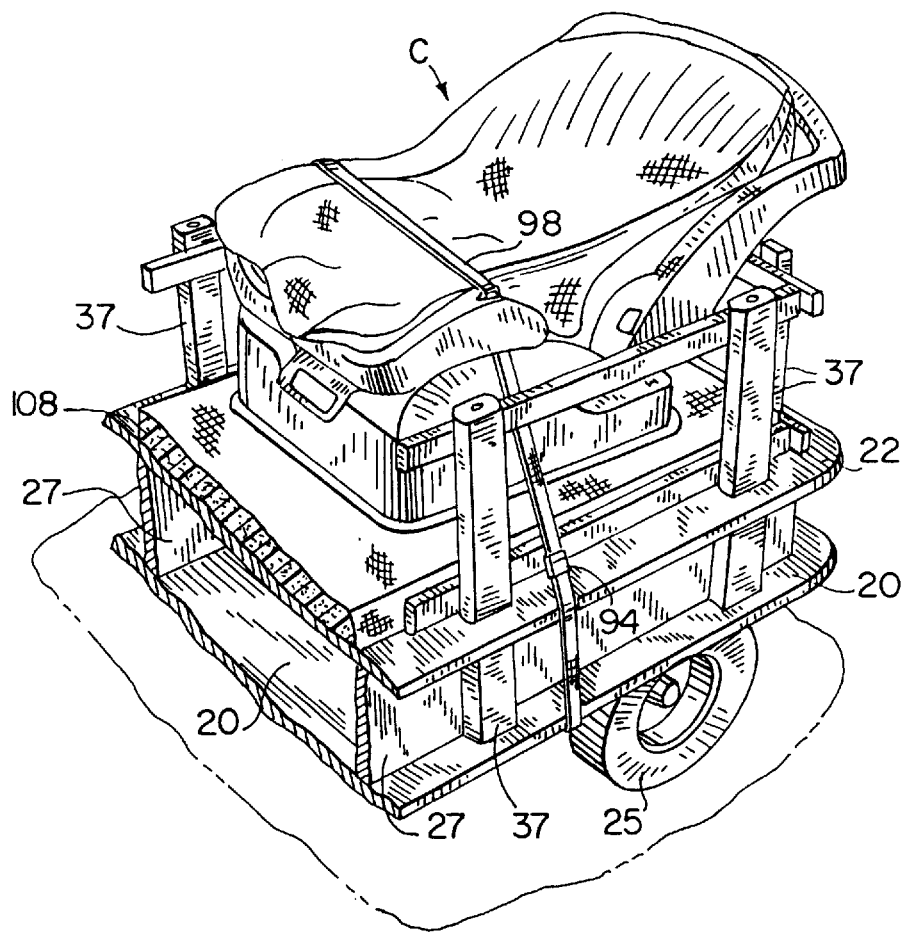
FIG. 14 is a fragmentary perspective view of the rear portion of the convertible wagon, and illustrating the wagon supporting and securing a child support or carseat positioned thereon.

Referring next to the views of FIGS. 9–11, inclusive and FIG. 14, it will be observed that the convertible wagon may be utilized as a "stroller" with a child support or carseat C supported by and secured to the wagon W. The child support or carseat C may be any of several commercially available types, and therefore will not be described in detail. It will be obvious, for safety reasons, that all child support or carseats must have some means of securing them to the vehicle upon which they are resting. In this case, the child support or carseat C is provided with an enclosed slot 97. The slot 97 is of sufficient size to retain the web of a woven holddown strap or belt 98. The opposite ends of the strap or belt 98 may latched to one another by means of a buckle 99, shown in detail in FIG. 11. The buckle includes a male member 100 molded of plastic or other suitable material and provided with a central guide finger 101 and two flexible outer fingers 102 space from the central guide finger 101. The outer fingers 102 are each provided with detents 103. The detents 103 of each of the outer fingers 102 are arranged to engage the shoulders 104 forming a part of inwardly movable, releasable latching members 105 of the molded female buckle portion 106. The construction of the buckle 99 permits a snap-type locking means by mere insertion of the male member 100 into the female member 106. Release of the buckle portions 100 and 106 maybe accomplished by finger pressure on the latching members 105 to release the shoulder portions from the detents 103.

For added comfort to the child, a foam pad 108 may be supplied between the child support or carseat C and the cover 22.

As shown in the views of FIGS. 9 and 10, the belt 98 may be anchored at opposite ends by means of a releasable hasps 109 respectively engaging an enclosed screweyes 110 secured to the underside of the flatbed 20 (See also FIG. 7).

What is claimed is:

1. A convertible wagon including a flat bed, front and rear wheels supported by and suspended below said flat bed, a primary enclosed compartment having three sides perpendicular to and supported by said flat bed, a hinged door providing access to and enclosing one end of said compartment, a top covering said compartment, a plurality of vertical side panels extending upwardly from said compartment top, each of said side panels including rails and supporting stiles, means releasably supporting said stiles, said releasable supporting means comprising flanged areas in said top covering the compartment and extending laterally outwardly relative to said compartment sides and door, a plurality of spaced apart apertures in said flanged areas and being arranged to slidably receive and support said panel stiles, and means for supporting a child's support seat resting on said top, said means comprising a slot formed in the child support seat, an elongated belt including a releasable buckle, said belt arranged to be threaded through and retained by said slot, and means for attaching each of opposite ends of said belt to said wagon, said belt attaching means comprising a pair of releasable hasps attached to respective opposite ends of said belt, enclosed screweyes respectively fastened to opposite undersides of said flat bed and arranged to receive and support a respective releasable hasp.

2. A convertible wagon including a flat bed, front and rear wheels supported by and suspended below said flat bed, a primary enclosed compartment having three sides perpendicular to and supported by said flat bed, a hinged door providing access to and enclosing one end of said compartment, a top covering said compartment, a plurality of vertical side panels extending upwardly from said compartment top, each of said side panels including rails and supporting stiles, means releasably supporting said stiles, said releasable supporting means comprising flanged areas in said top covering the compartment and extending laterally outwardly relative to said compartment sides and door, a plurality of spaced apart apertures in said flanged areas and being arranged to slidably receive and support said panel stiles, and means for supporting a child's support seat resting on said top, said means comprising a slot formed in the child support seat, an elongated belt including releasable buckle, said belt arranged to be threaded through and retained by said slot, and means for attaching for attaching each of opposite ends of said belt to said wagon, said belt attaching means comprising a pair of releasable hasps attached to respective opposite ends of said belt, enclosed screweyes respectively fastened to opposite undersides of said flat bed and arranged to receive and support a respective releasable hasp, a secondary storage compartment contained within the confines of said primary compartment, said secondary storage compartment being arranged for storage of said elongated belt for said child support seat.

\* \* \* \* \*